United States Patent
Keebler et al.

(10) Patent No.: US 8,149,570 B2
(45) Date of Patent: Apr. 3, 2012

(54) UNIVERSAL POWER SUPPLY SYSTEM

(76) Inventors: John C. Keebler, Arroyo Grande, CA (US); C. Stephen Keebler, Arroyo Grande, CA (US)

( * ) Notice: Subject to any disclaimer, the term of this patent is extended or adjusted under 35 U.S.C. 154(b) by 167 days.

(21) Appl. No.: 12/726,630

(22) Filed: Mar. 18, 2010

(65) Prior Publication Data

US 2011/0228449 A1  Sep. 22, 2011

(51) Int. Cl.
  *H02B 1/26* (2006.01)
  *H02H 3/22* (2006.01)
(52) U.S. Cl. ........ 361/622; 361/627; 361/632; 361/636; 307/11; 307/18; 307/139; 363/146; 439/620.01; 439/650
(58) Field of Classification Search .................. 361/600, 361/622–632, 641–647, 810, 93.1; 439/107, 439/131, 166, 174, 214, 441, 620.01, 650–654, 439/639, 638; 307/11, 12, 64, 40, 80.149–151, 307/70, 75, 72, 128, 139, 31, 38; 363/34, 363/53, 144, 146, 21.07, 147, 126
See application file for complete search history.

(56) References Cited

U.S. PATENT DOCUMENTS

| | | | |
|---|---|---|---|
| 4,232,260 A | | 11/1980 | Lambkin |
| 4,519,015 A | * | 5/1985 | Lin ................................ 361/752 |
| 5,280,229 A | | 1/1994 | Faude et al. |
| 5,424,903 A | * | 6/1995 | Schreiber ....................... 361/166 |
| 5,570,002 A | * | 10/1996 | Castleman .................... 323/283 |
| 5,900,684 A | * | 5/1999 | Lam .............................. 307/139 |
| 6,054,846 A | * | 4/2000 | Castleman .................... 323/283 |
| 6,111,772 A | | 8/2000 | Lee et al. |
| 6,172,891 B1 | * | 1/2001 | O'Neal et al. ................ 363/146 |
| 6,184,652 B1 | | 2/2001 | Yang |
| 6,204,637 B1 | | 3/2001 | Rengan |
| 6,211,649 B1 | | 4/2001 | Matsuda |
| 6,212,088 B1 | * | 4/2001 | Yoo .............................. 363/146 |
| 6,362,610 B1 | | 3/2002 | Yang |
| 6,459,175 B1 | * | 10/2002 | Potega .......................... 307/149 |
| 6,504,343 B1 | | 1/2003 | Chang |
| 6,507,507 B2 | * | 1/2003 | Tokunaga et al. .............. 363/89 |
| 6,538,341 B1 | * | 3/2003 | Lang .............................. 307/18 |

(Continued)

FOREIGN PATENT DOCUMENTS

EP  2120380 A2  11/2009

OTHER PUBLICATIONS

Ultra ULT40494 X-Pro Universal Notebook & Device AC Power Supply—USB Charger, 8x Modular Connectors, Digital Voltage Switcher. Downloaded from www.compusa.com Feb. 19, 2010.

*Primary Examiner* — Michail V Datskovskiy

(57) ABSTRACT

A universal power supply system having a power supply configured to generate a predetermined direct current output sufficient to simultaneously power a plurality of direct current powered devices connected thereto. A plurality of identical sockets are electrically coupled in parallel with the direct current output of the power supply. Individual power cables having a standardized first plug which fits into the sockets at one end and a device specific second plug at an opposing end. A voltage regulating circuit is operatively disposed in either the standardized first plug or device specific second plug which converts the intermediate direct current voltage generated by the power supply to a direct current voltage required by a particular direct current powered device.

21 Claims, 3 Drawing Sheets

U.S. PATENT DOCUMENTS

| | | | |
|---|---|---|---|
| 6,586,849 B2 * | 7/2003 | Tarr | 307/38 |
| 6,589,069 B1 | 7/2003 | Liao | |
| 6,664,758 B2 | 12/2003 | Yang | |
| 6,741,064 B2 | 5/2004 | Liu et al. | |
| 6,811,444 B2 * | 11/2004 | Geyer | 439/650 |
| 7,101,226 B1 * | 9/2006 | Gilliland | 439/620.01 |
| 7,212,420 B2 | 5/2007 | Liao | |
| 7,435,141 B2 * | 10/2008 | Tan et al. | 439/638 |
| 7,462,073 B2 * | 12/2008 | Bell et al. | 439/639 |
| D588,536 S | 3/2009 | Wahl et al. | |
| 7,543,171 B2 * | 6/2009 | Fortin et al. | 713/400 |
| 7,646,107 B2 * | 1/2010 | Smith | 307/11 |
| 7,649,279 B2 * | 1/2010 | Lanni | 307/11 |
| 7,930,043 B2 * | 4/2011 | Bhogal et al. | 700/22 |
| 7,969,702 B2 * | 6/2011 | Herrmann | 361/93.1 |
| 2002/0195993 A1 | 12/2002 | Chiu | |
| 2003/0222503 A1 * | 12/2003 | Lam et al. | 307/38 |
| 2004/0150267 A1 * | 8/2004 | Ferguson | 307/70 |
| 2008/0012423 A1 * | 1/2008 | Mimran | 307/11 |
| 2008/0137386 A1 * | 6/2008 | Jitaru et al. | 363/146 |
| 2008/0252251 A1 | 10/2008 | Joasil | |
| 2009/0322279 A1 | 12/2009 | McBurney | |

* cited by examiner

UNIVERSAL POWER SUPPLY SYSTEM

CROSS-REFERENCE TO RELATED APPLICATIONS

Not applicable

RELEVENT FIELD

This application is directed generally toward a power supply and more specifically toward a multiport direct current power supply.

BACKGROUND

Small electronic devices have become a major part of our lives. For example cellular telephones, laptop computers, network routers, computer peripherals, scanners, printers, cordless telephones, etc., generally all rely on low voltage direct current. These devices are usually connected to an alternating current outlet and converted to their proper direct current voltage utilizing a small power supply, commonly referred to as a "wall wart". Due to lack of standardization, physical design requirements and varying electrical power requirements of the electronic devices, the "wall warts" are manufactured to specifically power each individual electronic device. In addition, each "wall wart" is fitted with a plug dimensioned to fit a particular electronic device and supply a specific voltage thereto. In some instances, not only are the output voltages and plugs different, but the polarity of the output voltage is reversed such that using a "wall wart" of the proper voltage but improper polarity could damage the electronic device intended to be powered.

Moreover, modern electric building codes generally require an electrical outlet approximately every twelve feet of a perimeter wall in a room. Accordingly, a typical home office desk situated near a wall has only one or two available electrical outlets within reach to power such items as a desk lamp, computer, monitor, printer, telephone, speakers, network router, cable or DSL modem, etc., thus quickly exhausting the available electrical outlets. To address the limited electrical outlets, various electrical equipment manufacturers have developed power strips which allow a number of low power "wall warts" and power cords to be connected to a single electrical outlet.

However, the common physical design of a "wall wart" has a footprint which typically blocks the use of one or more adjacent power outlets resulting in less than optimum usage of the power strip. To overcome this problem, users may attempt to "daisy chain" a second power strip from the first power strip, a result that is not only unsightly but also a potential fire hazard. Lastly, the use of multiple "wall warts" results in wasted energy due to thermal and electrical losses.

SUMMARY

In view of the foregoing, various exemplary embodiments of a universal power supply system are disclosed. In one aspect, a universal power supply system includes a power supply configured to generate a predetermined direct current output sufficient to simultaneously power a plurality of direct current powered devices connected thereto. The universal power supply system includes a plurality of sockets electrically coupled in parallel with the direct current output of the power supply.

The universal power supply system may receive input power from either an alternating current source or a direct current source. A plurality of power cables are provided. One end of each power cable includes a standardized first plug dimensioned to fit any of the plurality of sockets. A second plug installed at an opposite end from the first plug is adapted to be received by a socket specific to at least one of the plurality of direct current powered devices. A voltage regulating circuit is installed in either the first or second plug. The voltage regulating circuit provides a direct current output voltage compatible with a direct current powered device intended to be powered therefrom. The voltage regulating circuit adjusts the predetermined direct current output of the power supply to the direct current output required by a particular direct current powered device.

In various aspects the first and/or second plug(s) may be color-coded to correspond with a particular voltage output and/or voltage polarity. Alternately, or in addition thereto, the first and/or second plug(s) may marked with indicia of a particular output voltage and/or intended direct current powered device name. In another aspect, all of the plurality of sockets are identical and disposed in a wall of a housing. The housing encompasses the power supply associated electrical circuits/modules and provides a structure in which the plurality of sockets may be electrically coupled with the power cables.

Various exemplary embodiments of a universal power supply system allows for improved power consumption efficiency, standardization of power cables, reduced fire hazards and lower overall manufacturing costs.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

DETAILED DESCRIPTION

Various exemplary embodiments of a universal power supply system are disclosed herein. In the following detailed description, numerous specific details are set forth in order to provide a thorough understanding of the present inventive embodiments. It will be apparent, however, to one skilled in the art that the present inventive embodiments may be practiced without these specific details. In other instances, well-known structures, devices or components may be shown in block diagram form in order to avoid unnecessarily obscuring the present inventive embodiments.

Figure 1:
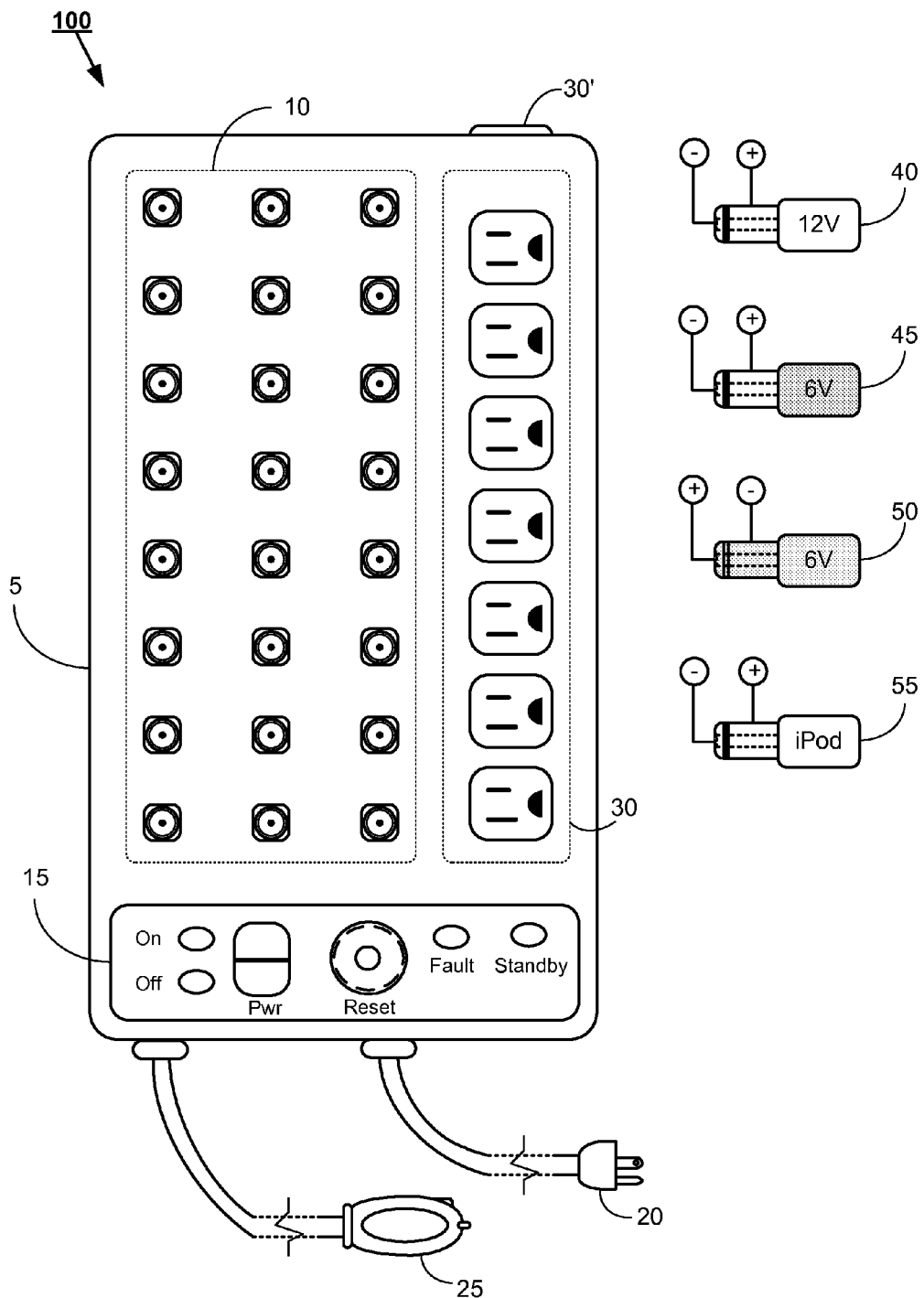
FIG. 1—depicts a top view of a universal power supply system in accordance with an exemplary embodiment.

Referring to FIG. 1, a top view of a universal power supply system 100 in accordance with an exemplary embodiment is depicted. In an exemplary embodiment, the universal power supply system 100 includes a housing 5 dimensioned to encompass the electrical components and circuits which form the universal power supply system 100. The housing 5 may be constructed of any suitable materials, for example, aluminum alloys, steel and/or high density polymers. A plurality of sockets 10 are installed in a wall of the housing 5. In an embodiment, each socket is identical to one another and arranged in an array generally formed by uniformly spaced columns and/or rows of sockets. In an exemplary embodiment, the universal power supply system 100 may include a control module 15. The control module 15 may include such electrical controls and features such as an ON/OFF switch, overload reset breaker, and/or status indicating light emitting diodes. In an exemplary embodiment, the universal power supply system 100 may include one or more standard alternating current sockets 30 to provide power to alternating current dependent electrical devices.

The one or more standard alternating current sockets 30 may be switched and/or un-switched depending primarily on design considerations. Optionally, an additional female plug 30' may be provided at a longitudinal end of the housing 5 to all for coupling an additional universal power supply module (not shown) to the universal power supply system 100. The additional universal power supply module may be configured as is shown in U.S. Pat. No. 6,111,772 to Lee et al., issued Aug. 29, 2000. U.S. Pat. No. 6,111,772 is hereby incorporated by reference in its entirety. The universal power supply system 100 may receive input power from a standard alternating current source 20 or a direct current source 25.

The plurality of sockets 10 are dimensioned to receive one or more plugs 40, 45, 50, 55. Any plug 40, 45, 50, 55 may be coupled with any one of the plurality of sockets 10. In an exemplary embodiment, each plug 40, 45, 50, 55 may be color-coded to indicate output voltage and/or voltage polarity 45, 50. Alternately, or in conjunction with the color coding, each plug may be marked with indicia of voltage, polarity and/or specific direct current powered device intended to be powered. The plurality of sockets 10 may be arranged in an array containing 5 or more sockets.

Figure 2:
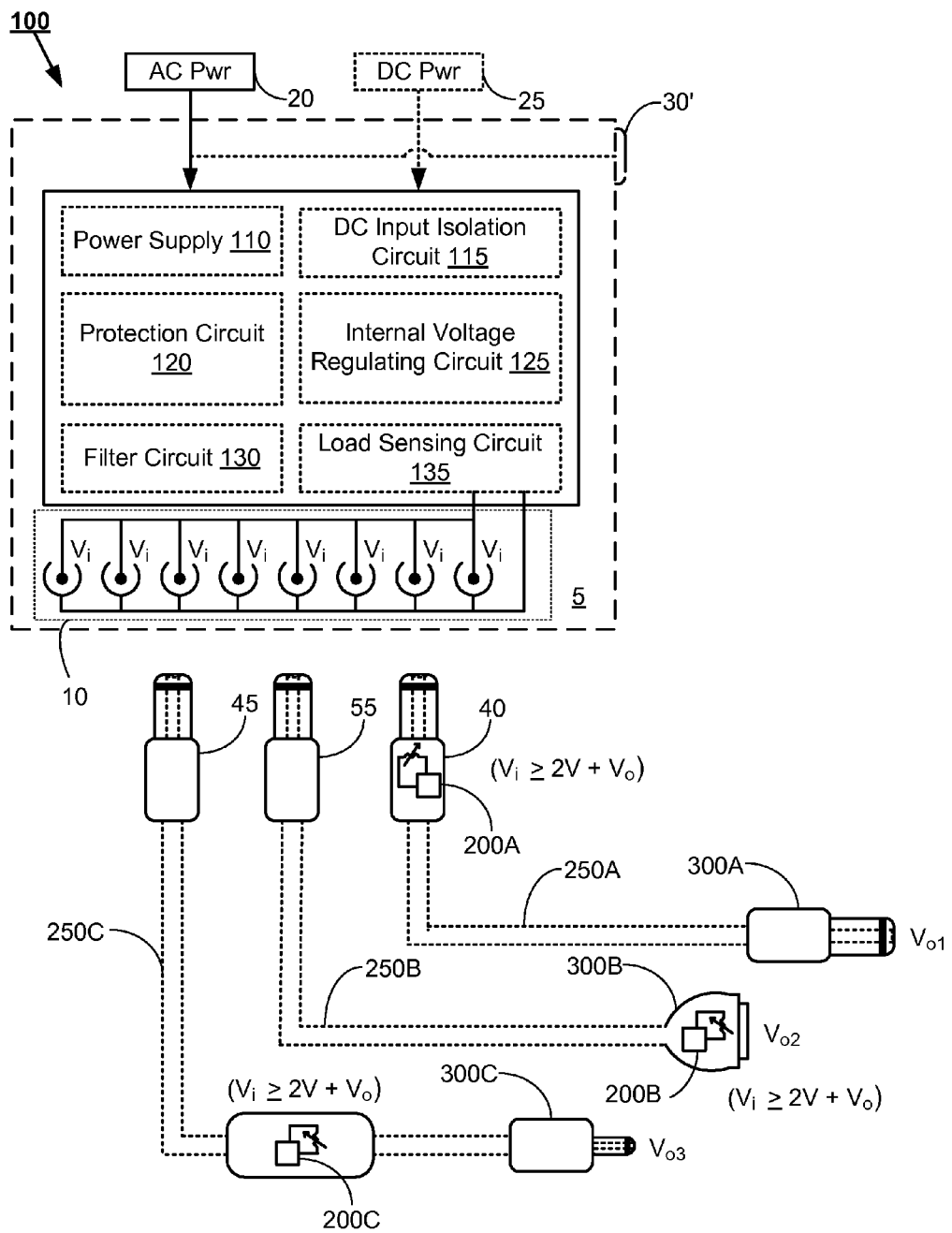
FIG. 2—depicts a block diagram of a universal power supply system in accordance with an exemplary embodiment.

Referring to FIG. 2, a block diagram of a universal power supply system 100 in accordance with an exemplary embodiment is depicted. In this exemplary embodiment, the housing 5 encompasses a power supply 110. The power supply 110 receives alternating current (AC) power from an AC power source 20 and converts the alternating current, typically 120 volts to a predetermined direct current intermediate voltage. The power supply 110 may be of any conventional type for example, a linear power supply or a switching power supply. The type of power supply chosen is dependent on design choice and/or manufacturing cost. The power rating of the power supply 110 should be sufficient to provide at least 110% of the maximum continuous current load anticipated to be drawn therefrom.

Alternately, in another exemplary embodiment, the universal power supply system 100 receives direct current (DC) from an external DC power source 25. The external DC power source 25 may be received from a separate AC/DC power supply or DC supply from a battery (e.g., vehicular battery). When both an external AC power supply 20 and DC power supply 25 are intended to be incorporated into the common housing 5, a DC input isolation circuit 115 may be provided to prevent back-feeding power through the power supply 110.

To protect the universal power supply system 100 and/or connected direct current powered devices from current overloads, overheating, voltage transients/surges and/or short circuits, a protection circuit 120 may be provided. The term protection circuit 120 is used generically herein to refer to surge protection, under/over voltage protection, short circuit protection and thermal protection. A voltage regulating circuit 125 is provided to maintain the constant intermediate DC voltage V, supplied to the plurality of sockets 10.

The voltage regulating circuit 125 may also include additional rectification to reduce AC ripple. Depending on the type of power supply selected, a filter circuit 130 may be provided to minimize generated electromagnetic interference (EMI). The filter circuit 130 may also incorporate capacitive storage capacity to minimize current variations under varying load conditions. A load sensing circuit 135 may be provided to reduce wasted power generated by the power supply 110 under no-load and low-load conditions.

Figure 3:
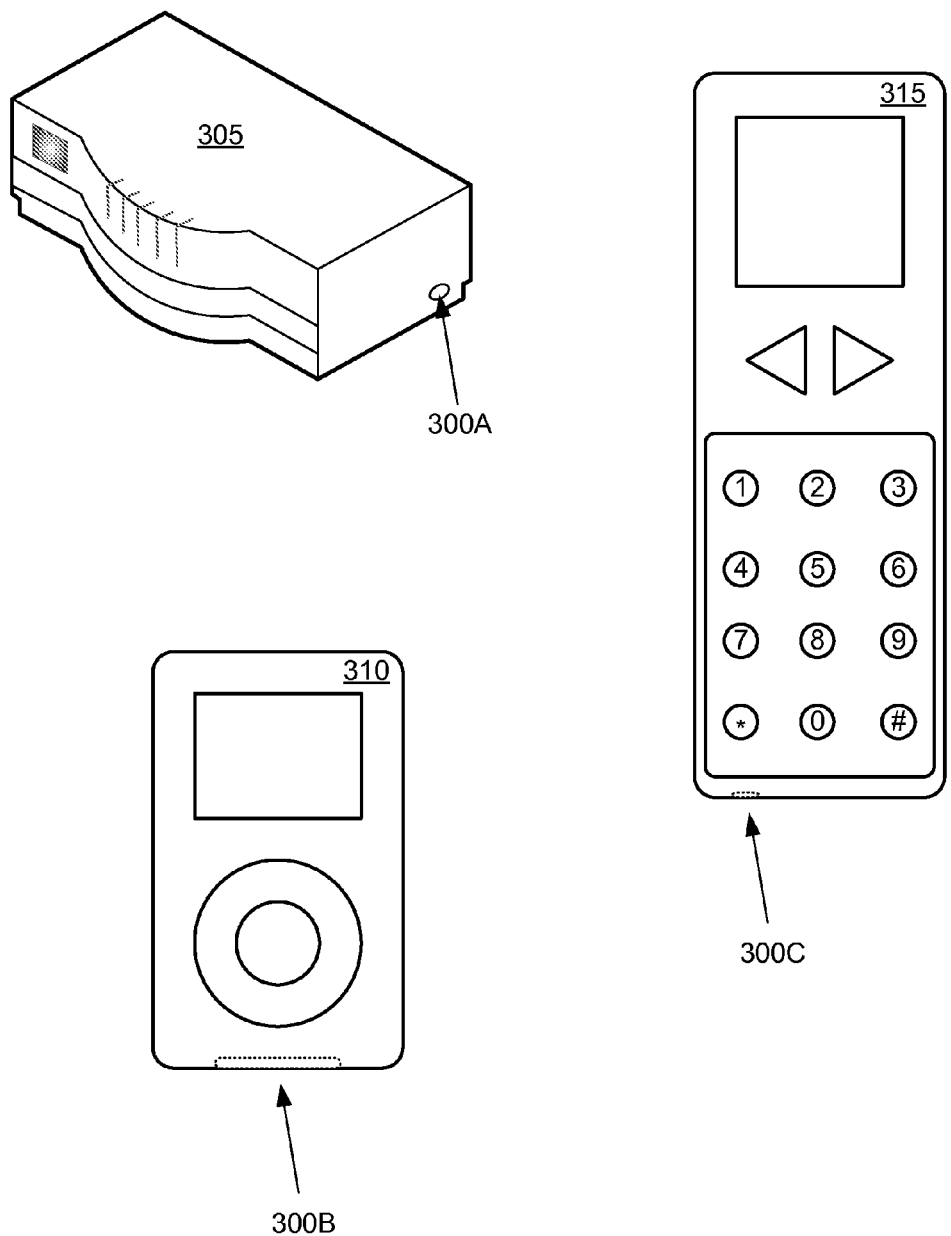
FIG. 3—depicts a plurality of direct current powered device which may be powered by a universal power supply system in accordance with an exemplary embodiment.

The intermediate DC output $V_i$ is supplied to the plurality of sockets 10 in a parallel electrical relationship for connection with a standardized first plug 40, 45, 50. Each standardized first plug 40, 45, 50 is electrically connected with a power cable 250A, 250B, 250C and with another second plug 300A, 300B, 300C configured to be received by a device socket associated with a particular direct current powered device 305, 310, 315 (FIG. 3). As with the standardized first plugs 40, 45, 50, the second device specific plugs 300A, 300B, 300C may be color-coded to indicate output voltage and/or voltage polarity 45, 50. Alternately, or in conjunction with the color coding, the second device specific plugs 300A, 300B, 300C may be marked with indicia of voltage, polarity and/or specific direct current powered device intended to be powered.

The power cables 250A, 250B, 250C may be constructed from any suitable multi-conductor wire of sufficient gauge to accommodate the electrical current demands of the individual direct current powered device 305, 310, 315 (FIG. 3) to be powered by the universal power supply system 100. The power cables 250A, 250B, 250C may also incorporate ferrite beads (not shown) to further reduce EMI. In an exemplary embodiment, the power cables 250A, 250B, 250C are constructed from a pair of wires which carry the positive and negative voltage components.

A voltage regulating circuit 200A, 200B, 200C may be operatively installed in either the first plug 40, second plug 300B or intermediate the first 45 and second plugs 300C. Each voltage regulating circuit 200A, 200B, 200C is preconfigured to provide a particular output voltage $V_o$. For example, the voltage regulating circuit 200A associated with power cable 250A may be configured to provide a 12V DC $V_{o1}$ output through the second plug 300A. Setting of the voltage regulating circuits 200A, 200B, 200C is typically accomplished by selection of voltage drop resistor values. Suitable voltage regulating chips are available from at least Fairchild Semiconductor models KA78XX/KA78XXA (www.fairchildsemi.com) or National Semiconductor models LM117/LM317/LM317A (www.national.com). Suitable voltage regulating chips available from other manufacturers may be used as well. The voltage regulating chips may be integrated into the first or second plugs using an injection molding process. One skilled in the art will appreciate that many manufacturing techniques may be used to produce the power cables with integral voltage regulating circuits as described herein.

In an exemplary embodiment, the intermediate output voltage $V_i$ is maintained at least 2V DC above the highest voltage to be supplied to the direct current powered device 305, 310, 315 (FIG. 3). This voltage differential is arbitrarily chosen to adjust for voltage drop under heavy load conditions according to the relationship $V_i \geq 2V + V_o$. However, the actual intermediate output voltage $V_i$ generated by the power supply 110 and maintained by the internal voltage regulating circuit 125 is dependent on the type and ratings of the power supply 110 and/or tolerances of the internal voltage regulating circuit 125. A voltage and/or current feedback line is not required for the universal power supply system 100 although a feedback line can be accommodated to support battery charging requirements.

Referring to FIG. 3, a plurality of direct current powered devices 305, 310, 315 which may be powered by a universal power supply system 100 in accordance with an exemplary embodiment are depicted. In one example, a common network router 305 is depicted which receives DC power from the second plug 300A. In second example, a multi-media player (IPod®) 310 is depicted which receives DC power from the second plug 300B. In a third example, a cellular telephone 315 receives DC power from the second plug 300C. In each of these examples, the second plugs 300A, 300B, 300C are different in physical dimensions (i.e., device specific) and may operate at different direct current voltages as is shown in FIG. 1.

As discussed above, each plug (first, second or both) may be color-coded and/or marked to identify the output voltage, polarity and/or particular direct current powered device a particular power cord is configured to be used with. The user selects the proper power cable suitable for a particular direct current powered device 305, 310, 315. Once the proper power cable has been selected, the user simply inserts the first standardized plug 40, 45, 50 into one of the plurality of sockets 10 and the second device specific plug 300A, 300B, 300C into the particular direct current powered device 305, 310, 315 to be powered.

The universal power supply system 100 described herein reduces guesswork in attempting to select the proper "wall wart," reduces electrical power consumption by providing an efficient unitary power supply, reduces the tangle of wires, "wall warts" and power cables currently required to be connected to power strips known in the relevant art and reduces potential fire hazards caused by electrical overloads.

The various exemplary inventive embodiments described herein are intended to be merely illustrative of the principles underlying the inventive concept. It is therefore contemplated that various modifications of the disclosed embodiments will, without departing from the inventive spirit and scope, be apparent to persons of ordinary skill in the art. They are not intended to limit the various exemplary inventive embodiments to any precise form described. In particular, it is contemplated that the universal power supply system may be constructed from any suitable electrical and/or electronic components known in the relevant art. No specific limitation is intended to a particular electrical component, module, or layout described. Other variations and inventive embodiments are possible in light of above teachings, and it is not intended that this Detailed Description limit the inventive scope, but rather by the Claims following herein.

What is claimed:

1. A universal power supply system comprising:
a power supply configured to generate a predetermined direct current output sufficient to simultaneously power a plurality of direct current powered devices coupled thereto;
a plurality of sockets electrically coupled in parallel with the direct current output of the power supply;
a plurality of power cables, each power cable having a first plug and a second plug connected at opposing ends;
the first plug adapted to couple with at least a portion of the plurality of sockets;
the second plug adapted to be received by a socket specific to at least one of the plurality of direct current powered devices;
a voltage regulating circuit disposed in either the first or second plug, the voltage regulating circuit adapted to provide an output voltage compatible with the at least one direct current powered device.

2. The universal power supply system of claim 1 wherein the power supply outputs a uniform direct current voltage to each of the plurality of sockets.

3. The universal power supply system of claim 1 wherein the voltage regulating circuit is configured to adjust the voltage generated by the power supply to the compatible voltage of the direct current powered device.

4. The universal power supply system of claim 1 wherein each of the plurality of sockets are identical.

5. The universal power supply system of claim 1 wherein one of the first or second plug is color-coded to correspond with a particular voltage output.

6. The universal power supply system of claim 5 wherein one of the first or second plug is further color-coded to correspond with a particular voltage polarity.

7. The universal power supply system of claim 1 wherein one of the first or second plug is marked with indicia of a particular output voltage.

8. The universal power supply system of claim 1 wherein the direct current power supply receives an input voltage from an external source.

9. The universal power supply system of claim 1 wherein the external source is an alternating current outlet.

10. The universal power supply system of claim 1 wherein the external source is a vehicular battery.

11. A universal power supply system comprising:
a housing containing a power supply configured to generate a predetermined direct current output sufficient to simultaneously power a plurality of direct current powered devices coupled thereto;
a plurality of uniformly dimensioned sockets disposed in a wall of the housing and electrically coupled in parallel with the direct current output of the power supply;
a plurality of power cables, each power cable having a first plug and a second plug connected at opposing ends;
the first plug adapted to couple with any of the plurality of sockets;
the second plug adapted to be received by a socket specific to at least one of the plurality of direct current powered devices;
a voltage regulating circuit disposed in either the first or second plug, the voltage regulating circuit adapted to provide an output voltage compatible with the at least one direct current powered device.

12. The universal power supply system of claim 11 wherein the second plug is dimensioned to correspond with a particular voltage output.

13. The universal power supply system of claim 11 wherein the power supply includes a electrical load sensing circuit for adjusting output power in dependence on electrical demand.

14. The universal power supply system of claim 11 wherein the power supply generates a voltage at least two volts greater than any voltage required to power the at least one direct current powered device.

15. The universal power supply system of claim 13 wherein the electrical load sensing circuit reduces power generated by the power supply to minimize wasted energy generation.

16. The universal power supply system of claim 11 wherein one of the first or second plug is marked with indicia specific to the at least one direct current powered device.

17. The universal power supply system of claim 11 wherein the plurality of sockets are arranged in an array.

18. A universal power supply system comprising:
a regulated switching power supply for generating a predetermined direct current output sufficient to simultaneously power a plurality of direct current powered devices coupled thereto;
a plurality of uniformly dimensioned sockets electrically coupled in parallel with the direct current output of the power supply;
a plurality of power cables, each power cable having a first plug and a second plug connected at opposing ends;
the first plug adapted to couple with any of the plurality of sockets;
the second plug adapted to be received by a socket specific to at least one of the plurality of direct current powered devices;
a voltage regulating circuit disposed in either the first or second plug, the voltage regulating circuit adapted to provide an output voltage compatible with the at least one direct current powered device;
a electrical load sensing circuit coupled to the regulated switching power supply for adjusting output power in dependence on electrical demand.

19. The universal power supply system of claim 18 wherein the powers cables convey only electrical power to the at least one direct current powered device.

20. The universal power supply system of claim 18 wherein the number of uniformly dimensioned sockets exceeds five.

21. The universal power supply system of claim 18 wherein the universal power supply system operates without a separate feedback line.

* * * * *